UNITED STATES PATENT OFFICE.

PHILIP GROS, OF SAN FRANCISCO, CALIFORNIA.

VARNISH-CLEANING COMPOSITION.

1,096,427. Specification of Letters Patent. Patented May 12, 1914.

No Drawing. Application filed July 30, 1913. Serial No. 781,981.

*To all whom it may concern:*

Be it known that I, PHILIP GROS, a citizen of the United States, residing in the city and county of San Francisco and State of California, have invented new and useful Improvements in Varnish-Cleaning Compositions, of which the following is a specification.

This invention relates to a new and useful composition of matter to be used for cleaning and polishing varnished surfaces.

My composition consists of the following ingredients, combined in approximately the proportions stated, viz:

| | |
|---|---|
| Tetrachlorid of carbon | 130 grams. |
| Benzin (pure) | 50 " |
| Soap solution consisting of white soap 10%, alcohol 90% | 45 " |
| Varnish consisting of gum sandarac 1, gum mastic 1, shellac 1, alcohol 10 | 25 " |
| Linseed oil | 6 " |
| Oil of sweet almond | 4 " |
| Oil of wintergreen | 4 " |
| Chloroform (commercial) | 5 " |

These ingredients are to be thoroughly mingled by agitation.

The above-named composition is applied in the following manner: A soft woolen rag or like material is partly saturated with the solution. The varnished article to be cleaned is then rubbed with the rag until the surface is bright and clean. The composition thus applied not only cleans and brightens the varnish, but supplies this with oil which is quickly absorbed, thus preventing the varnish from drying and cracking.

The composition once applied and thoroughly rubbed in produces a high polish and dries so quickly that dust is prevented from lodging and again soiling the surface.

Having thus described my invention, what I claim and desire to secure by Letters Patent is—

1. The herein described composition of matter consisting of approximately the following substances and proportions, tetrachlorid of carbon 130 grams, benzin 50 grams, soap solution 45 grams, varnish 20 grams, linseed oil 6 grams, oil of sweet almond 4 grams, oil of wintergreen 4 grams, chloroform 5 grams, substantially as described and for the purpose specified.

2. The herein described composition of matter for cleaning varnish consisting of approximately the following substances and proportions: tetrachlorid of carbon 130 grams, benzin (pure) 50 grams, soap solution, (consisting of white soap 10%, alcohol 90%) 45 grams, varnish (consisting of gum sandarac 1 part, gum mastic 1 part, shellac 1 part, alcohol 10 parts) 25 grams, linseed oil 6 grams, oil of sweet almond 4 grams, oil of wintergreen 4 grams, and chloroform (commercial) 5 grams.

In testimony whereof I have hereunto set my hand in the presence of two subscribing witnesses.

PHILIP GROS.

Witnesses:
PAUL GROS,
JULIUS CALMANN.